US011946009B2

United States Patent
Despres et al.

(10) Patent No.: US 11,946,009 B2
(45) Date of Patent: Apr. 2, 2024

(54) STEAM CRACKING CONTROL FOR IMPROVING THE PCI BLACK GRANULES

(71) Applicant: EUROPEENNE DE BIOMASSE, Paris (FR)

(72) Inventors: Jean-Luc Despres, Verzenay (FR); Thomas Habas, Paris (FR); Adriana Quintero-Marquez, Le Vesinet (FR); Frédéric Martel, Riems (FR)

(73) Assignee: EUROPEENNE DE BIOMASSE, Paris (FR)

( * ) Notice: Subject to any disclaimer, the term of this patent is extended or adjusted under 35 U.S.C. 154(b) by 56 days.

(21) Appl. No.: 17/608,668

(22) PCT Filed: Apr. 30, 2020

(86) PCT No.: PCT/FR2020/050730
§ 371 (c)(1),
(2) Date: Nov. 3, 2021

(87) PCT Pub. No.: WO2020/255505
PCT Pub. Date: Nov. 12, 2020

(65) Prior Publication Data
US 2022/0235288 A1    Jul. 28, 2022

(30) Foreign Application Priority Data

May 3, 2019  (FR) ...................... 1904682

(51) Int. Cl.
*C10L 5/44*       (2006.01)
*C10L 9/08*       (2006.01)

(52) U.S. Cl.
CPC ................. *C10L 5/442* (2013.01); *C10L 9/08* (2013.01); *C10L 2200/0469* (2013.01);
(Continued)

(58) Field of Classification Search
CPC .... C10L 5/442; C10L 9/08; C10L 2200/0469; C10L 2250/06; C10L 2290/06; C10L 2290/58; C10L 5/44; C10L 5/363
See application file for complete search history.

(56) References Cited

U.S. PATENT DOCUMENTS 4,828,573 A     5/1989  Jelks
2011/0302832 A1*  12/2011  Gronn ...................... C10L 9/08
                                                        44/589

(Continued)

FOREIGN PATENT DOCUMENTS

CL      2012003469 A1    4/2013
EP         2373767 B1    7/2018
(Continued)

OTHER PUBLICATIONS

International Search Report for International Application No. PCT/FR2020/050730 dated Sep. 9, 2020, 4 pages.
(Continued)

*Primary Examiner* — Ellen M McAvoy
(74) *Attorney, Agent, or Firm* — TraskBritt

(57) ABSTRACT

The present disclosure relates to a method for continuously preparing a pulverulent material having a calorific power greater than the calorific power of the initial biomass, the method comprising a steam cracking step, wherein the initial biomass consists of elements having a grain size distribution of between P25 and P100, having a humidity of less than 27%, and directly subjected to a steam cracking treatment.

4 Claims, 2 Drawing Sheets

(52) U.S. Cl.
CPC ....... *C10L 2250/06* (2013.01); *C10L 2290/06* (2013.01); *C10L 2290/58* (2013.01)

(56) References Cited

U.S. PATENT DOCUMENTS

| | | | |
|---|---|---|---|
| 2012/0006320 A1 | 1/2012 | Nguyen | |
| 2015/0361367 A1* | 12/2015 | Tait | C10L 5/445 |
| | | | 44/589 |
| 2016/0002555 A1* | 1/2016 | Brusletto | C10L 5/363 |
| | | | 44/590 |
| 2016/0153010 A1 | 6/2016 | Gerlach et al. | |
| 2016/0153310 A1 | 6/2016 | Schwarz et al. | |
| 2016/0251611 A1 | 9/2016 | Ottonello et al. | |
| 2018/0161781 A1* | 6/2018 | Vieslet | F26B 5/08 |
| 2018/0334630 A1* | 11/2018 | Scalzo | C10L 5/442 |
| 2019/0203134 A1* | 7/2019 | Joronen | C10L 10/06 |
| 2020/0332375 A1* | 10/2020 | Björklund | C10L 5/363 |
| 2022/0306959 A1* | 9/2022 | Marin | C10B 49/02 |
| 2022/0315851 A1* | 10/2022 | Despres | C10L 5/08 |
| 2022/0315853 A1* | 10/2022 | Despres | C10B 53/02 |
| 2022/0315854 A1* | 10/2022 | Despres | B27N 3/007 |
| 2023/0193149 A1* | 6/2023 | Quintero-Marquez | ...... |
| | | | C10L 5/143 |
| | | | 44/589 |

FOREIGN PATENT DOCUMENTS

| | | |
|---|---|---|
| RU | 2518068 C2 | 6/2014 |
| WO | 2016/163877 A1 | 10/2016 |

OTHER PUBLICATIONS

ARIPO Examination Report for AP/P/2021/013595, dated Apr. 17, 2023, 2 pages.
Chilean Search Report for CL 202102875, dated Jul. 6, 2023, 2 pages.
English Translation of Russian Office Action for RU Application No. 2021134167, 3 pages.
Geir Skjevrak et al., Pelletizing and Combustion Behaviors of Wood Waste With Additives Mixing, APPEEC, 2012 Asia-Pacific, IEEE, Mar. 27, 2012, 5 pages.
Hendriks et al., Pretreatments to Enhance the Digestibility of Lignocellulosic Biomass, Bioresource Technology, Elsevier, Amsterdam, NL, vol. 100, No. 1, Jan. 1, 2009, pp. 10-18.
India Examination Report for IN 202117055187, dated Feb. 2, 2023, 7 pages.
Indonesia Search Report for Application No. P00202110983 dated Sep. 8, 2023, 2 pages.
International Written Opinion for International Application No. PCT/FR2020/050730 dated Sep. 9, 2020, 5 pages.
Philippines Substantive Examination Report for PH 1/2021/552780, dated Mar. 20, 2023, 6 pages.
Russian Office Action for Application No. 2021134167/04 dated Apr. 30, 2020.
Ukrainian Examination Report for UA Application No. a202106895, dated Aug. 18, 2023, 5 pages.
Columbian Examination Report for Application No. 2021014874 dated Jan. 22, 2024, 5 pages.

* cited by examiner

|       | Main fraction > 80% of the weight | Thinness < 5% | Fraction with a particle size greater than ... *(the value cited below)* must be < 1% |
|-------|-----------------------------------|---------------|-----------------------------------------------------------------------|
| P8[7] | P < 8 mm                          | < 1 mm        | < 45 mm                                                               |
| P16   | 3.15 mm ≤ P ≤ 16 mm               | < 1 mm        | > 46 mm, all < 85 mm                                                  |
| P45   | 3.15 mm ≤ P ≤ 45 mm               | < 1 mm        | > 63 mm                                                               |
| P63   | 3.15 mm ≤ P ≤ 63 mm               | < 1 mm        | > 100 mm                                                              |
| P100  | 3.15 mm ≤ P ≤ 100 mm              | < 1 mm        | > 200 mm                                                              |
| P300  | 3.15 mm ≤ P ≤ 300 mm              | < 1 mm        | > 400 mm                                                              |

FIG. 2

STEAM CRACKING CONTROL FOR IMPROVING THE PCI BLACK GRANULES

CROSS-REFERENCE TO RELATED APPLICATIONS

This application is a national phase entry under 35 U.S.C. § 371 of International Patent Application PCT/FR2020/050730, filed Apr. 30, 2020, designating the United States of America and published as International Patent Publication WO 2020/225505 A1 on Nov. 12, 2020, which claims the benefit under Article 8 of the Patent Cooperation Treaty to French Patent Application Ser. No. 1904682, filed May 3, 2019.

TECHNICAL FIELD

The present disclosure relates to the field of valorization of lignocellulosic biomass, in particular for the production of "black pellet" fuels with a high calorific value.

BACKGROUND

The transformation of lignocellulosic biomass (wood, agricultural residues, by-products of agriculture and industrial agriculture) into an energetically dense, transportable and easily storable compound would allow for the development and consolidation of a stationary energy industrial sector (biofuel used at a fixed point, in residential premises, contrary to biofuels) and to reduce environmental impacts (fossil CO2 emissions, with a biomass that is free of fertilizers and phytosanitary products).

Black pellets are moisture-resistant cylinders measuring 1 to 3 cm in length, with good mechanical strength allowing for storage and handling that is similar to coal. Its combustion generates little ash, with a lower heating value (LHV) that is close to 18 to 20 joules/gram of dry matter.

Black pellets are produced using lignocellulosic biomass subjected to a heat treatment, followed by a brutal depressurization that provides a waterproof material for the production of pellets or briquettes. The raw material is actually blasted with steam, which releases finer particles, allowing the material to form a strong cohesion during the aggregation or molding phase.

Steam cracking differs from a hydrothermal pretreatment, also known as aqueous fractionation, solvolysis, hydrothermolysis, or hydrothermal processing, in that the latter involves the use of water at a high temperature and with high pressure to promote the disintegration and separation of the lignocellulosic matrix. This technique is not suitable for the production of black pellets as the products obtained are mostly liquid.

Hydrothermal pretreatment, also referred to as aqueous fractionation, solvolysis, hydrothermolysis or hydrothermal treatment is a liquid hot water pretreatment process using water at a high temperature and with high pressure to promote the disintegration and separation of the lignocellulosic matrix.

Steam cracking cannot be equated with any hydrothermal pretreatment methods, in that it uses steam penetration followed by explosive decompression. The invention described in the referenced patent application uses the steam cracking system in the realization of this process without mention of a hydrothermal pretreatment system.

In the state of the art, European patent EP2373767B1 is acknowledge, this patent describing a process for the batch production of black pellets using a lignin-containing material.

This process includes the following steps:
(a) passing the lignin-containing material with a relative moisture content of 0 to 20% by weight through a reactor;
(b) heating the lignin-containing material to 180° C. to 235° C. by injecting steam into the reactor;
(c) holding the material in the reactor at the temperature reached for 1 to 12 minutes to soften the material and release the lignin;
(d) reducing the pressure in the reactor in at least one step; and
(e) forming the processed material into pellets or briquettes.

The lignin-containing material is a lignocellulosic material, a material comprising wood, bamboo, bagasse, straw or grass, in the form of chips measuring 25 mm in length. The final pressure reduction of the reactor takes place suddenly by steam blasting, so that the material is defibrated.

U.S. Patent Application Publication No. US2016/251611A1 has otherwise been proposed, describing a process for growing a microbial organism comprising a steam cracking heat treatment step of an initial lignocellulosic biomass. Heat treatment by steam cracking includes the following steps:
(a) The initial biomass undergoes a hydrothermal pretreatment by subjecting the cellulosic material to at least one soaking operation,
(b) then, the cellulosic material is transported through at least one reactor under pressure. The cellulosic material is then heated to a temperature of between 170° C. and 230° C.

U.S. Patent Application Publication Nos. US2016/153010A1 and US2012/006320A1 have also been acknowledged in the prior art, describing processes for converting lignocellulosic biomass into ethanol and other products based on continuous hydrothermal pretreatment followed by enzymatic hydrolysis, fermentation and ethanol recovery. The processes describe a steam cracking step comprising:
(a) the combination of the acid-impregnated lignocellulosic biomass feedstock with H2O at a temperature of between 140° C. and 230° C. and a pressure between 75 psig to about 250 psig for a period of approximately 1 to 15 minutes in a contact zone to produce a steam-treated filler;
(b) then transferring the steam-treated load to a depressurization zone to produce a volatilized fraction of the steam-treated load for a period of approximately 2 to 30 minutes; and
(c) finally releasing at least part of the volatilized fraction from the depressurization zone to allow for temperature and pressure control in the depressurization zone.

The prior art solutions for producing black pellets are promising. However, they have their limitations, notably the amount of energy provided per volume of pellet, which although superior to biomass in the form of chips or white pellets, is still 30 to 40% lower than coal for the same volume or weight.

Moreover, the solutions of the prior art propose discontinuous processes in batches, using sequential treatments of biomass volumes, limiting the immediate effects of a control of steam cracking conditions.

Finally, the prior art solutions offer various applications for the processes described, such as: the process of growing a microbial organism or the conversion processes of the biomass into ethanol. They have no application in the production of "black pellet" fuels.

BRIEF SUMMARY

In order to remedy these disadvantages, the present disclosure relates in its most general sense to a process for the continuous preparation of a powdered material having a calorific value greater than the calorific value of the initial biomass, comprising a steam cracking step characterized by the initial biomass consisting of elements of a particle size class of between P16 and P100, exhibiting a humidity of less than 27%, directly subjected to a steam cracking treatment. In a particular embodiment, the initial biomass consists of elements with a particle size class between P25 and P100.

Therefore, the disclosure relates to a process for the continuous preparation of a powdered material having a calorific value greater than the calorific value of the initial biomass, comprising a steam cracking step characterized by the initial biomass consisting of elements of a particle size class between P16 and P100, exhibiting a humidity of less than 27%, directly subjected to a steam cracking treatment.

In one variant, the severity factor of the steam cracking step is greater than 3.7 and less than 4.2.

In another variant, the severity factor of the steam cracking step is controlled based on the carbon content in a sample of steam-cracked biomass.

In another variant, the severity factor of the steam cracking step is controlled based on the carbon content in the off-gas.

Preferably, the severity factor of the steam cracking step should be driven by the carbon content of a sample of steam-cracked biomass.

In a particular implementation mode, the severity of the steam cracking step is controlled by the signal generated by a pH sensor.

In one variant, the pH is adjusted by adding lime, carbon dioxide, or dissociated forms of carbon dioxide.

The disclosure also relates to the application of a preparation process for a powdered material according to the disclosure, for the preparation of pellet fuels.

The disclosure also relates to a steam cracker unit for the implementation of this process.

BRIEF DESCRIPTION OF THE DRAWINGS

The present disclosure will be better understood from reading the following detailed description of a not-limiting example of the disclosure, wherein

FIG. 1 is an example of the realization of a steam cracker unit 10, in particular for the manufacture of a combustible material using biomass chopped down to a particle size between P16 and P100, according to the disclosure. In the preferred embodiment, the biomass will have a particle size between P20 and P100 or even between P25 and P100.

FIG. 2 is a table representing the characteristics of the different particle size classes according to the nature of the elements that compose the material.

DETAILED DESCRIPTION

Figure 1:
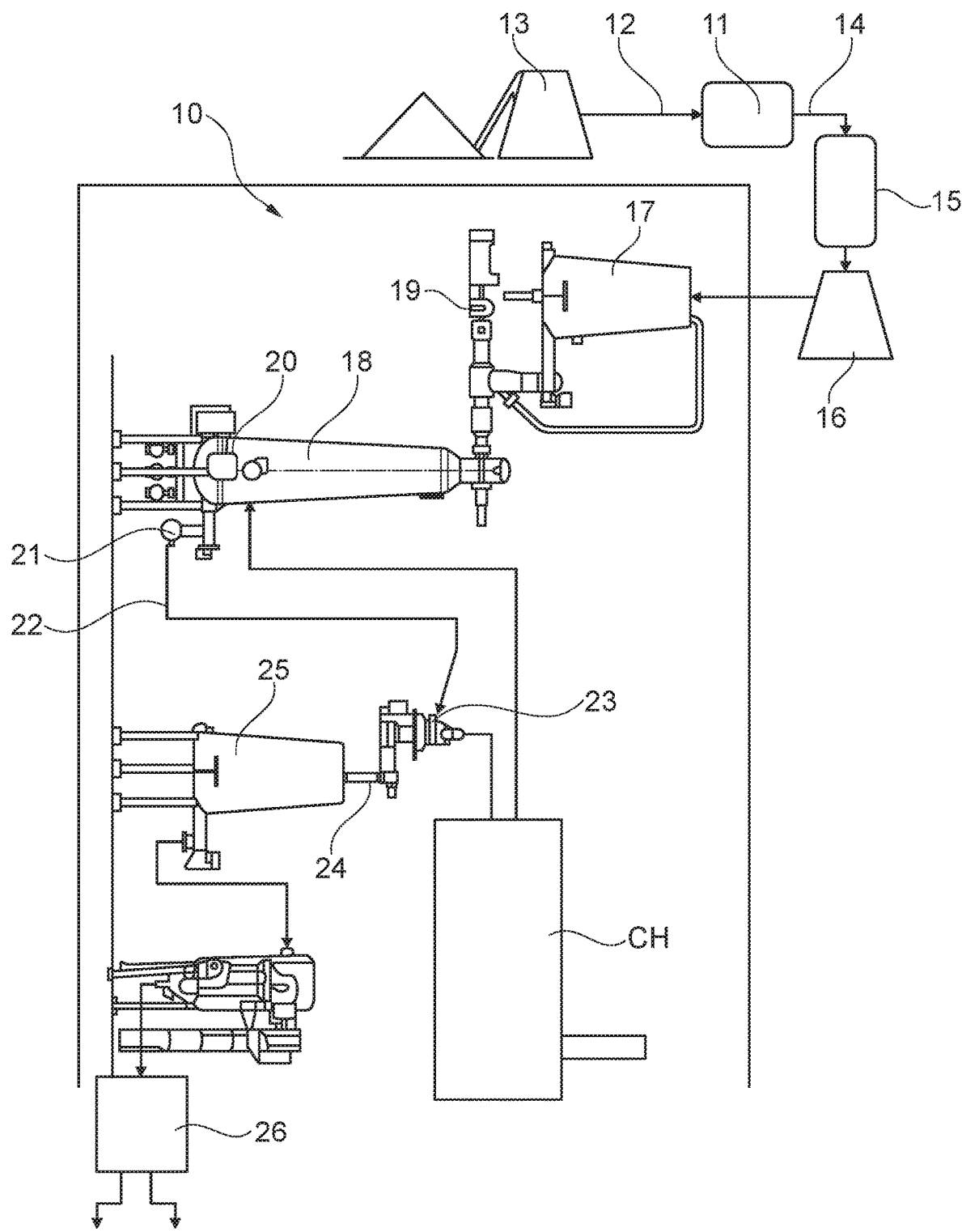
FIG. 1 represents a schematic view of a continuous production facility according to the disclosure.

The steam cracker unit is fed with biomass consisting of elements with particle size classes between P16 and P100, with a moisture content of less than 27%.

Particle size is defined by the particle size of the main fraction (P) and the particle size defining the coarse fraction (G). Particles smaller than one millimeter are considered to belong to the fine fraction. The main fraction P must represent at least 80% overall of the fuel.

According to the size and percentage of the elements constituting the main fraction (P), the coarse fraction (G) and the fine fraction, the particle size of the elements of the biomass is defined according to reference class. These reference classes are pre-established by the European Committee for Standardization (CEN/TS 14961) in the technical specification document (CEN/TS), which serves as a normative document in domains wherein the current state of the art is not yet stable enough for a European standard.

CEN/TS also specifies that 80% (overall) of the fuel must pass through a sieve corresponding to the particle size class and must be retained in the sieve corresponding to a particle size of 3.15 mm.

The coarse fraction G should not exceed 1% of the overall mass. The fine fraction should not exceed 5% of the overall mass.

P16 corresponds to a grain size with 3.15 mm≤P≤16 mm, and G>45 mm

P25 corresponds to a grain size with 3.15 mm≤P≤25 mm, and G>63 mm

P100 corresponds to a grain size with 3.15 mm≤P≤100 mm, and G>200 mm

The particle size of a wafer sample can be determined using an oscillating sieve system, a rotary sieve or an imaging measurement system.

The biomass is shredded with sharp tools (mill blades), and is directly subjected to steam cracking treatment without humidification or any other treatment.

The thermal treatment of the biomass is carried out with slightly saturated steam at a temperature between 195° C. and 215° C. The processing time is between 5 and 30 minutes.

The Treatment Severity Factor is defined using the formula: $FS = \log_{10}(time(min) * \exp((T° C. - 100)/14.75))$. The higher the temperature and the longer the treatment time, the greater the severity and the more transformation in the product.

The lower calorific value on a dry basis increased on average by 0.7 joules per gram, with a variation of 0.25 to 2 joules per gram depending on the severity of the heat treatment, starting from 17 to 19 joules per dry gram of initial wood, that is to say a gain of between 2 and 12% in LHV, around 4% on average.

Depending on the severity of the heat treatment, the material losses ranged from just a few % to 24%.

The higher the severity, the greater the loss and the greater the gain in Inferior Calorific Power. During steam cracking, it is mainly the hemicelluloses that are attacked. The main soluble volatiles generated are furfural, acetic acid and formic acid. These soluble volatiles are found in the emitted steam ("evaporates"). Depending on the type of gasoline used, the nature of the condensates varies. Therefore, furfural is more important for oak (up to 60% of VOCs) while for pine, acetic acid is dominant (up to 50% of VOCs).

Description of the Facility

This steam cracker unit (10) comprises a hammer mill (11) fed with biomass by means of an auger (12). A separator removes any oversized elements before the chips enter the hammer mill (11). In this wet hammer mill (11), the biomass is ground into fragments with a particle size of between P25 and P100.

The silo (13) is filled by a bucket loader that collects the biomass from piles formed on the ground storage areas. The biomass is discharged from the hammer mill (11) onto a conveyor belt (14), which is equipped with a weighing belt, and which then transports it to the feed hopper of a hot air dryer (15).

A moisture sensor continuously monitors the moisture content of the biomass. The biomass fragments are extracted from the silo (16) by a planetary screw and deposited onto a conveyor belt that transports them to a feed silo (17) of a reactor (18) allowing for the continuous treatment of 15 tons of biomass per hour.

The reactor (18) is a pressure reactor into which superheated steam is injected from its lower part with a pressure of 18 bar and a temperature of 250° C. This vertical reactor has a conical shape to avoid the formation of plugs. The steam flow is extracted from the reactor at its upper level. At the output of the reactor, the steam is returned to the CH boiler in which it was produced.

It is noted that in the reactor (18) the temperature of the steam is 203° C. and the pressure is 16.7 bar. The feed silo (17) is shaped like a truncated ellipsoid in order to facilitate the flow of the biomass fragments.

In addition, a rotating scraper in the feed silo (17) pushes the biomass fragments towards a feedscrew (19). This conical feedscrew (19), which has a cross-section that narrows as the screw enters the reactor (18), continuously takes a predetermined quantity of biomass fragments from the feed silo (17), pre-compresses it and pushes it through a screw passage into the reactor (18) under pressure. The dimensions of the conical orifice and the screw were selected respectively, in order to minimize the pressure loss in the reactor and expel the air contained in the biomass fragments.

It should be noted that the compression force exerted by the screw on the fragments of biomass makes it possible to advantageously expel part of the residual water present in the fragments of biomass.

At the end of the feedscrew (19), the compacted biomass fragments form a compact block that is dispersed in the reactor by the steam flow. Dispersed biomass fragments fall into the reactor due to gravity upon being heated by the steam flow, and settle on top of the fragments that have previously accumulated on the bottom of the reactor, where they continue to be heated by the steam flow.

It should be noted that the hold time for the biomass fragments in the reactor (18) is controlled according to the level of the biomass fragments that have accumulated on the bottom of the reactor (18). In this particular embodiment of the disclosure, the hold time is set at 7 minutes, which corresponds to a severity factor of 3.8. At the bottom of the reactor (18), a scraper mounted on a vertical axis (not shown in FIG. 1) pushes the biomass fragments towards a discharge feedscrew (20) allowing for the extraction of the biomass fragments from the reactor (18).

This discharge feedscrew (20) pushes the biomass fragments out of the reactor toward a valve (21) with a controlled opening. The opening of this valve is continuously adjusted to control the flow of biomass fragments extracted from the reactor. Under the pressure of the steam present in the reactor and/or the discharge feedscrew (20), biomass fragments are continuously expelled through the valve openings (21) at a very high speed into an expansion line (22) and are carried by the steam flow leaving the reactor with these biomass fragments into the pressure reduction line (22) to a separation unit (23).

Note that the pressure in the pressure reduction line gradually decreases until it reaches a pressure of about 1.1 bar at the separator. Thus, an explosive decompression of the biomass fragments occurs, due to a revaporization of part of the condensation water present in the biomass fragments. This sudden expansion of the water vapor leads to the appearance of shear forces in the combined fragments of biomass, which causes the mechanical rupture of the structure of the latter.

In the separation unit (23), the mixture of biomass fragments and steam enters tangentially to a rapidly rotating blade. Under the effect of the centrifugal force generated by this blade, the biomass fragments are projected into a discharge pipe (24), while the steam is ejected from the separator through a valve.

In a variant of this embodiment of the disclosure, a pressurized cyclone may be implemented to separate the biomass fragments from the residual steam. It should be noted that the rejected steam contains volatile materials that can be advantageously burned in a boiler.

The biomass fragments projected into a discharge pipe (24) are discharged into a storage silo (25), and will then be transformed into pellets with a diameter of approximately 7 millimeters and an average length of 22 millimeters in a pellet press (26).

Adjustment of the Steam Cracking Conditions

The continuous operation of the steam cracker allows a real time control of the operating conditions and in particular:
Of the severity factor
Of the pH of the biomass.

For this purpose, a measurement of the chemical characteristics of the effluents, or of the chemical characteristics of the solubilized samples of the steam-cracked biomass, can be taken.

Real-Time Analysis of Effluents

The real-time measurement of the chemical characteristics of the effluents allows for the evaluation of the material losses of the steam-cracked biomass, resulting in an increase in the carbon content of the effluents. This information can be acquired in real time by an infrared probe positioned in the effluent evacuation pipe.

The signal provided in real time by the probe is representative of the variations of the carbon level in the effluents. This signal is used by a computer to modify the steam cracker parameters, namely the severity rate, according to a function predetermined by the objectives: for example, maximization of the LHV.

The probe can also analyze other organic compounds, particularly oxygenated compounds, and provide mapping information for the organic compounds in the effluents in order to control the steam cracking parameters.

Real-Time Analysis of Steam-Cracked Biomass Sampling

The steam cracker unit can also comprise a system for real-time sampling of the steam-cracked biomass, with solubilization of this sample in order to collect information on the chemical composition using one or more physico-chemical probes, for example, a pH measurement or a measurement of the organic compound composition.

This information is then used by a computer to automatically optimize the steam cracker unit parameters in real time.

Pelletizing Application

For the production of pellet fuels with a moisture content of less than 10%, the moisture content of the final product before pelletizing must be controlled.

For this purpose, the initial biomass has a low moisture content prior to steam cracking, which is namely less than 14% and preferably less than 10%.

Alternatively, the initial biomass can be steam-cracked with a moisture content higher than 14%, but lower than 27%. In this case, a drying step of the steam-cracked biomass is provided downstream of the steam cracker unit, before or after pelletizing.

The invention claimed is:

1. A process for the continuous preparation of a powdered material having a calorific value greater than the calorific value of an initial biomass before steam cracking, comprising: a steam cracking stage, wherein the initial biomass subjected to the steam cracking stage is constituted of elements with a particle size class of between P16 and P100, having a moisture content of less than 27%, the initial biomass being directly subjected to a steam cracking treatment in the steam cracking stage at a temperature of from about 195° C. to about 215° C. for from about 5 minutes to about 30 minutes characterized by a severity factor in the steam cracking stage which is controlled by a computer based on a carbon content measured in an off-gas of the steam cracking stage to maximize a lower heating value of the powdered material.

2. The process of claim 1, wherein the severity factor in the steam cracking stage is greater than 3.7 and less than 4.2.

3. The process of claim 1, further comprising a biomass pelletizing step for preparation of pellet fuels.

4. The process of claim 2, further comprising a biomass pelletizing step for preparation of pellet fuels.

\* \* \* \* \*